United States Patent Office.

BENJAMIN T. BABBITT, OF NEW YORK, N. Y.

Letters Patent No. 75,828, dated March 24, 1868.

---

IMPROVED PROCESS FOR PRESERVING COFFEE.

---

The Schedule referred to in these Letters Patent and making part of the same.

---

TO ALL WHOM IT MAY CONCERN:

Be it known that I, BENJAMIN T. BABBITT, of the city, county, and State of New York, have invented a new and improved Process of Preparing Coffee for use; and I do hereby declare that the following is a full, clear, and exact description of the same.

In the process of roasting coffee, as ordinarily practised in preparing the same for use, much of the aroma thereof is unavoidably lost or dissipated, and furthermore, from the difficulty of maintaining a uniform heat, the quality of the coffee is otherwise frequently impaired. The object of this invention is to obviate these objections to the common process of preparation, and to this end it consists in boiling or cooking the green coffee in olive-oil, butter, or equivalent oleaginous or unctuous material, whereby not only is the escape or dissipation of the aroma or volatile constituents of the coffee wholly obviated, but the deterioration of the same, from want of uniformity in the temperature to which it is subjected, is also effectually prevented, inasmuch as the oil or like material may be easily kept at any desired heat.

To enable others to understand the nature of my invention, I will proceed to describe it.

In carrying out my invention, I take a cauldron or other vessel, of any suitable kind and capacity, and furnished with any appropriate appliances for heating to the required degree. In this cauldron I place a quantity of olive or other oil, or butter or animal fat, and raise the same to a temperature of, preferably, about 400° Fahrenheit, whereupon the green coffee is placed therein, and subjected to the cooking or boiling action of the heated oil or material for a space of time, which, when the oil is at the temperature hereinbefore set forth, is found to be properly about five minutes. The coffee, being thus boiled or prepared, is removed from the cauldron, and placed upon or within a suitable strainer, in order that the oil or unctuous matter may drain therefrom, and the coffee be brought to a cool condition. It is preferred, however, that the coffee, in the first instance, be placed within a wire-gauze or other strainer, which, being placed bodily within the cauldron, allows the coffee to be boiled or prepared as just herein fully set forth, and serves as a convenient means whereby the entire quantity of coffee may be removed from the cauldron at once, preparatory to the requisite draining of the oil or unctuous matter therefrom, as just mentioned.

The coffee being surrounded by the hot oil or equivalent unctuous matter during its preparation, the escape of the aroma or volatile portion thereof is effectually provided against; and inasmuch as the oil may be readily kept at the desired temperature during the whole operation, any injury to the quality of the coffee by excessive heating is prevented. Furthermore, the hot oil being brought in immediate contact with the entire surfaces of the coffee-grains or berries, the operation of preparing the same, as set forth, involves only a small portion of the time required in carrying out the ordinary roasting-process, while little or no additional expense is incurred, inasmuch as the oil, butter, or other like material, after having been once heated, may be used repeatedly in the preparation of different quantities or batches of coffee.

What I claim as my invention, and desire to secure by Letters Patent, is—

The process of preparing coffee for use by boiling or cooking the same in olive-oil, butter, or equivalent oleaginous or unctuous material, substantially as herein set forth.

B. T. BABBITT.

Witnesses:
A. LE CLERC.
CHAS. H. ASHTON.